US011636253B2

(12) United States Patent
Shin et al.

(10) Patent No.: US 11,636,253 B2
(45) Date of Patent: Apr. 25, 2023

(54) METHOD, SYSTEM, AND NON-TRANSITORY COMPUTER READABLE RECORDING MEDIUM FOR WRITING MEMO FOR AUDIO FILE THROUGH LINKAGE BETWEEN APP AND WEB

(71) Applicants: NAVER CORPORATION, Seongnam-si (KR); LINE CORPORATION, Tokyo (JP)

(72) Inventors: Jieun Shin, Seongnam-si (KR); Gilhwan Hwang, Seongnam-si (KR); Ye Lim Jeong, Seongnam-si (KR); Hyangnam Oh, Seongnam-si (KR); Dai-Hyun Lim, Seongnam-si (KR); Dongyeol Lee, Seongnam-si (KR)

(73) Assignees: NAVER CORPORATION, Seongnam-si (KR); LINE CORPORATION, Tokyo (JP)

(*) Notice: Subject to any disclaimer, the term of this patent is extended or adjusted under 35 U.S.C. 154(b) by 0 days.

(21) Appl. No.: 17/450,208

(22) Filed: Oct. 7, 2021

(65) Prior Publication Data
US 2022/0108061 A1 Apr. 7, 2022

(30) Foreign Application Priority Data

Oct. 7, 2020 (KR) .................. 10-2020-0129266

(51) Int. Cl.
*G06F 40/169* (2020.01)
*G06F 3/0482* (2013.01)
(Continued)

(52) U.S. Cl.
CPC .......... *G06F 40/169* (2020.01); *G06F 3/0482* (2013.01); *G06F 3/0484* (2013.01);
(Continued)

(58) Field of Classification Search
CPC ...... G06F 40/169; G06F 16/958; G06F 16/64; G06F 3/04817; G06F 3/0482; G06F 3/0484; G06F 2203/04803; G10L 15/26
See application file for complete search history.

(56) References Cited

U.S. PATENT DOCUMENTS 9,202,469 B1 * 12/2015 Moorjani ................ G10L 25/78
2008/0033986 A1 * 2/2008 McCusker ............. G06F 16/61
707/999.005

(Continued)

FOREIGN PATENT DOCUMENTS

JP  2005341015 A  12/2005
JP  2005345508 A  12/2005
(Continued)

OTHER PUBLICATIONS

Office Action issued in corresponding to Japanese patent application No. 2021-14193, dated Mar. 22, 2022.
(Continued)

*Primary Examiner* — Daniel Samwel
(74) *Attorney, Agent, or Firm* — Greer Burns & Crain Ltd.

(57) ABSTRACT

An audio record management method includes linking an app dedicated for audio record management installed in a first device and a website dedicated for audio record management connected to a second device; displaying an audio file being recorded or being played back in the app on a file list on the website through linkage between the app and the website; and providing a memo creation screen for the audio file on the website in response to a selection of the audio file from the file list.

16 Claims, 11 Drawing Sheets

(51) Int. Cl.
  *G06F 3/04817*  (2022.01)
  *G10L 15/26*  (2006.01)
  *G06F 16/958*  (2019.01)
  *G06F 16/64*  (2019.01)
  *G06F 3/0484*  (2022.01)
(52) U.S. Cl.
  CPC .......... *G06F 3/04817* (2013.01); *G06F 16/64* (2019.01); *G06F 16/958* (2019.01); *G10L 15/26* (2013.01); *G06F 2203/04803* (2013.01)

(56) References Cited

U.S. PATENT DOCUMENTS

| | | | | |
|---|---|---|---|---|
| 2012/0029918 | A1* | 2/2012 | Bachtiger | G06F 16/60 704/235 |
| 2012/0171994 | A1* | 7/2012 | Singh | H04W 4/20 455/410 |
| 2015/0137972 | A1* | 5/2015 | Nepo | G08B 25/006 340/539.13 |
| 2015/0154205 | A1* | 6/2015 | Grano | G06Q 30/0214 705/26.8 |
| 2015/0262617 | A1* | 9/2015 | Jaime | H04N 5/77 386/241 |
| 2017/0365258 | A1* | 12/2017 | Cho | G10L 15/22 |
| 2019/0303089 | A1* | 10/2019 | Mukherji | G11B 27/34 |
| 2020/0104802 | A1* | 4/2020 | Kundu | G06F 16/9535 |
| 2021/0044640 | A1* | 2/2021 | He | G10L 15/26 |

FOREIGN PATENT DOCUMENTS

| | | |
|---|---|---|
| JP | 2011244372 A | 12/2011 |
| JP | 2014222290 A | 11/2014 |
| KR | 1020080097361 A | 11/2008 |
| KR | 1020130111187 A | 10/2013 |
| KR | 1020140062217 A | 5/2014 |
| KR | 1020170116385 A | 10/2017 |
| WO | 2016163028 A1 | 10/2016 |

OTHER PUBLICATIONS

Office Action issued in corresponding Japanese patent application No. 2021-14193, dated Oct. 18, 2022.
Office Action issued in corresponding Korean patent application No. 10-2020-0129266, dated Oct. 17, 2022.

\* cited by examiner

METHOD, SYSTEM, AND NON-TRANSITORY COMPUTER READABLE RECORDING MEDIUM FOR WRITING MEMO FOR AUDIO FILE THROUGH LINKAGE BETWEEN APP AND WEB

CROSS-REFERENCE TO RELATED APPLICATION(S)

This U.S. non-provisional application claims the benefit of priority under 35 U.S.C. § 119 to Korean Patent Application No. 10-2020-0129266 filed on Oct. 7, 2020, in the Korean Intellectual Property Office (KIPO), the entire contents of which are incorporated herein by reference.

BACKGROUND OF THE INVENTION

Field of Invention

One or more example embodiments of the following description relate to technology for writing a memo for an audio file.

Description of Related Art

In general, mobile audio conversion technology may record an audio, for example, voice, on a mobile device and, when audio recording is completed, may convert the audio of a recorded section to text and may display the converted text on a display screen.

As an example, technology for performing an audio recording and a text conversion is disclosed in Korean Patent Laid-Open Publication No. 10-2014-0062217 published on May 23, 2014.

BRIEF SUMMARY OF THE INVENTION

One or more example embodiments provide a method and a system that may provide an audio recording function and a memo writing function in a network connection state through linkage between an app and a website.

One or more example embodiments also provide a method and a system that may display a status of an audio file in an app on a file list on a website through linkage between the app and the website.

One or more example embodiments also provide a method and a system that may select a file being recorded in an app on a website and may write a memo while recording through linkage between the app and the website.

According to an aspect of at least one example embodiment, there is provided an audio record management method performed by a computer apparatus having at least one processor configured to execute computer-readable instructions included in a memory, the audio record management method including, by the at least one processor, linking an app dedicated for audio record management installed in a first device and a website dedicated for audio record management connected by a second device; and displaying an audio file being recorded or being played back in the app on a file list on the website through linkage between the app and the website.

The linking of the app and the website may include maintaining a network connection state for an audio record management service between the first device and the second device by linking the app and the website that are logged in with the same user account.

The displaying of the audio file may include displaying status information in the app related to the audio file on the file list on the website.

The displaying of the audio file may include displaying status information and a recording time or a playback time in the app related to the audio file on the file list on the web site.

The displaying of the audio file may include displaying a memo creation menu for the audio file being recorded or played back in the app on the file list on the website.

The audio record management method may further include, by the at least one processor, providing a memo creation screen for the audio file on the website in response to a selection of the audio file from the file list.

The providing of the memo creation screen may include displaying a timestamp based on a recording time or a playback time in the app for each memo written through the memo creation screen on the website.

The audio record management method may further include, by the at least one processor, providing a memo written for the audio file in a form linking the app and the website in association with the audio file.

The audio record management method may further include, by the at least one processor, managing a memo written for the audio file by matching the memo to an audio record in which the audio file is converted to text.

The audio record management method may further include, by the at least one processor, jointly displaying the audio record and the memo through a dual view scheme in response to a selection of the audio file in the app or the website.

According to an aspect of at least one example embodiment, there is provided a non-transitory computer-readable record medium storing instructions that, when executed by a processor, cause the processor to computer-implement the audio record management method.

According to an aspect of at least one example embodiment, there is provided a computer apparatus including at least one processor configured to execute computer-readable instructions recorded in a memory. The at least one processor includes a device linker configured to link an app dedicated for audio record management installed in a first device and a website dedicated for audio record management connected by a second device; and a status displayer configured to display an audio file being recorded or being played back in the app on a file list on the website through linkage between the app and the website.

According to some example embodiments, it is possible to improve user convenience for a service use by jointly providing an audio recording function and a memo writing function in a network connection state through linkage between an app and a website.

According to some example embodiments, it is possible to display the status of an audio file in an app on a file list on a website through linkage between the app and the website, and to select a file being recorded in the app on the website and to write a memo while recording through linkage between the app and the website.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein.

Figure 1:
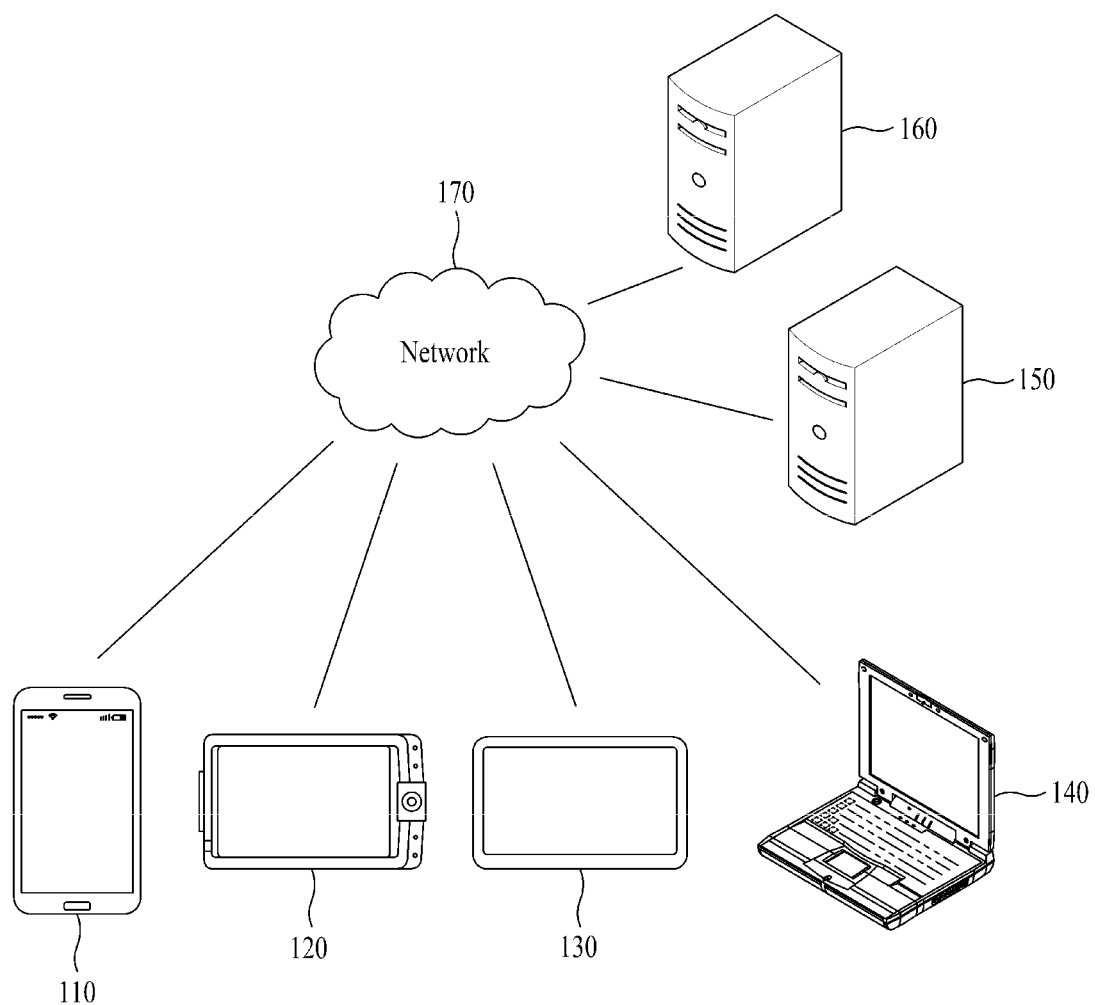
FIG. 1 is a diagram illustrating an example of a network environment according to at least one example embodiment.

It should be noted that these figures are intended to illustrate the general characteristics of methods and/or structures utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION OF THE INVENTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flowcharts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. A computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. Computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. Computer programs, program code, instructions, or some combination thereof, may be loaded into the one or more storage devices and/or the one or more computer processing devices from a remote data storage device via a network interface, rather than via a local computer readable storage medium. Additionally, computer programs, program code, instructions, or some combination thereof, may be loaded into the one or more storage devices and/or the one or more processors from a remote computing system that is configured to transfer and/or distribute computer programs, program code, instructions, or some combination thereof, over a network. The remote computing system may transfer and/or distribute computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different from that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

An audio record management system according to the example embodiments may be implemented by at least one computer apparatus, and an audio record management method according to the example embodiments may be performed through at least one computer apparatus included in the audio record management system. Here, a computer program according to an example embodiment may be installed and run on a computer apparatus. The computer apparatus may perform the audio record management method according to the example embodiments under control of an executed computer program. The computer program may be stored in a non-transitory computer-readable record medium to computer-implement the audio record management method in conjunction with the computer program.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. The number of electronic devices or the number of servers in the network environment is not limited thereto. Also, the network environment of FIG. 1 is provided as an example only among environments applicable to the example embodiments. The environments applicable to the example embodiments are not limited to the network environment of FIG. 1.

Each of the plurality of electronic devices 110, 120, 130, and 140 may be a fixed terminal or a mobile terminal that is configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner.

The communication scheme in the network environment may include a near field wireless communication scheme between devices as well as a communication scheme using a communication network (e.g., a mobile communication network, wired Internet, wireless Internet, a broadcasting network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a service to the plurality of electronic devices 110, 120, 130, and 140 connected over the network 170. For example, the service may include an audio record management service (or a minutes management service), a content providing service, a group call service (or an audio (i.e., voice) conference service), a messaging service, a mail service, a social network service, a map service, a translation service, a financial service, a payment service, and a search service.

Figure 2:
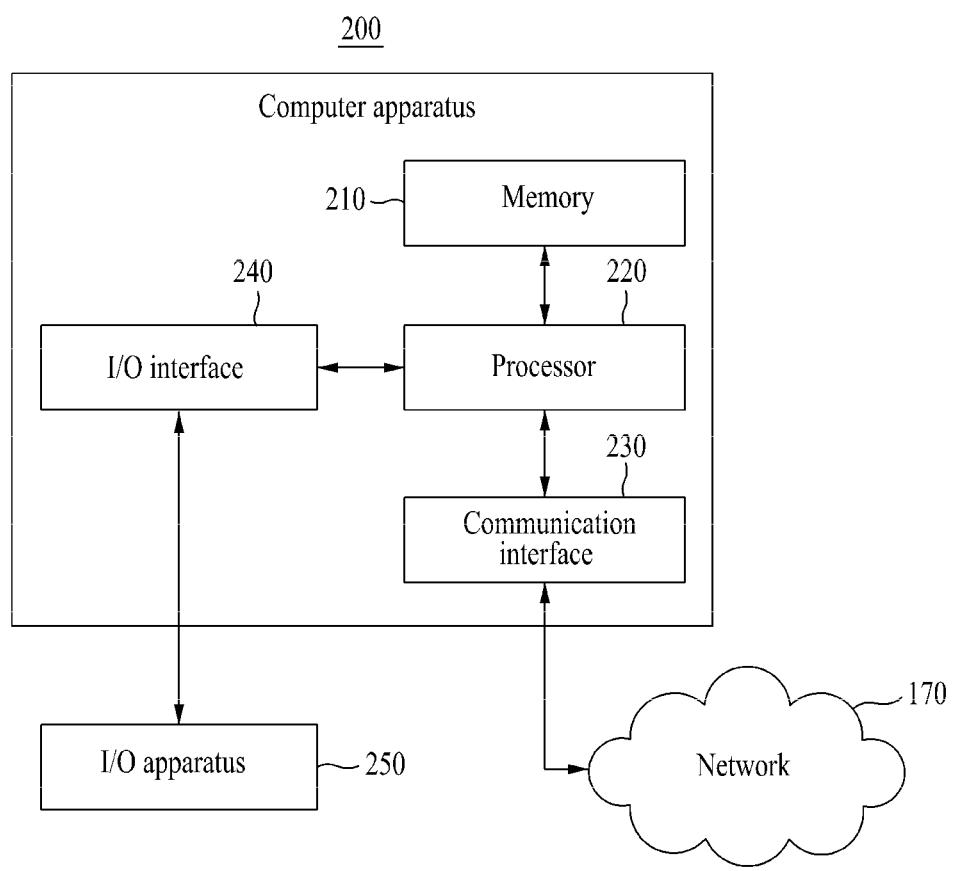
FIG. 2 is a diagram illustrating an example of a computer apparatus according to at least one example embodiment.

FIG. 2 is a block diagram illustrating an example of a computer apparatus according to at least one example embodiment. Each of the plurality of electronic devices 110, 120, 130, and 140 or each of the servers 150 and 160 may be implemented by the computer apparatus 200 of FIG. 2.

Referring to FIG. 2, the computer apparatus 200 may include a memory 210, a processor 220, a communication interface 230, and an input/output (I/O) interface 240. The memory 210 may include a permanent mass storage device, such as a random access memory (RAM), a read only memory (ROM), and a disk drive, as a non-transitory computer-readable record medium. The permanent mass storage device, such as ROM and a disk drive, may be included in the computer apparatus 200 as a permanent storage device separate from the memory 210. Also, an OS and at least one program code may be stored in the memory 210. Such software components may be loaded to the memory 210 from another non-transitory computer-readable recording medium separate from the memory 210. The other non-transitory computer-readable recording medium may include a non-transitory computer-readable recording medium, for example, a floppy drive, a disk, a tape, a DVD/CD-ROM drive, a memory card, etc. According to other example embodiments, software components may be loaded to the memory 210 through the communication interface 230, instead of the non-transitory computer-readable recording medium. For example, the software components may be loaded to the memory 210 of the computer apparatus 200 based on a computer program installed by files received over the network 170.

The processor 220 may be configured to process instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to the program code stored in the storage device, such as the memory 210.

The communication interface 230 may provide a function for communication between the computer apparatus 200 and another apparatus, for example, the aforementioned storage devices. For example, the processor 220 of the computer apparatus 200 may forward a request or an instruction created based on a program code stored in the storage device such as the memory 210, data, and a file, to other apparatuses over the network 170 under the control of the communication interface 230. Inversely, a signal, an instruction, data, a file, etc., from another apparatus may be received at the computer apparatus 200 through the communication interface 230 of the computer apparatus 200. For example, a signal, an instruction, content, data, etc., received through the communication interface 230 may be forwarded to the processor 220 or the memory 210, and a file, etc., may be stored in a storage medium, for example, the permanent storage device, further includable in the computer apparatus 200.

The I/O interface 240 may be a device used for interfacing with an I/O apparatus 250. For example, an input device of the I/O apparatus 250 may include a device, such as a microphone, a keyboard, a mouse, etc., and an output device of the I/O apparatus 250 may include a device, such as a display, a speaker, etc. As another example, the I/O interface 240 may be a device for interfacing with an apparatus in which an input function and an output function are integrated into a single function, such as a touchscreen. The I/O apparatus 250 may be configured as a single apparatus with the computer apparatus 200.

According to other example embodiments, the computer apparatus 200 may include greater or less number of components than the number of components shown in FIG. 2. For example, the computer apparatus 200 may include at least a portion of the I/O apparatus 250, or may further include other components, for example, a transceiver, a database.

Hereinafter, example embodiments of a method and a system to write a memo for an audio file through linkage between an app and a website are described. Herein, the term "audio" used in an audio file, an audio recording, etc., may generally refer to voice.

Many people perform an audio recording with mobile devices in conferences or various meeting situations, and write memos using other devices, for example, a PC, for contents related to an audio being recorded.

As described above, since an audio recording and a memo may be stored in different devices, the audio and the memo need to be separately verified, which makes it difficult to verify the memo while grasping the overall flow of the recorded contents.

To outperform the above issues, the example embodiments provide an audio record management service that may provide an audio recording function and a memo function as a single integrated function including audio recording and text conversion, match the result of converting recorded audio to text (hereinafter, simply "audio record") and a memo written during recording, and jointly manage the audio record and the memo.

In particular, the example embodiments provide an audio recording function and a memo writing function by maintaining a network connection state between a device for recording an audio and a device for writing a memo through linkage or interworking between an app and a website dedicated for providing an audio record management service, so that where an operation is performed in one, the same or related operation is performed in the other.

Figure 3:
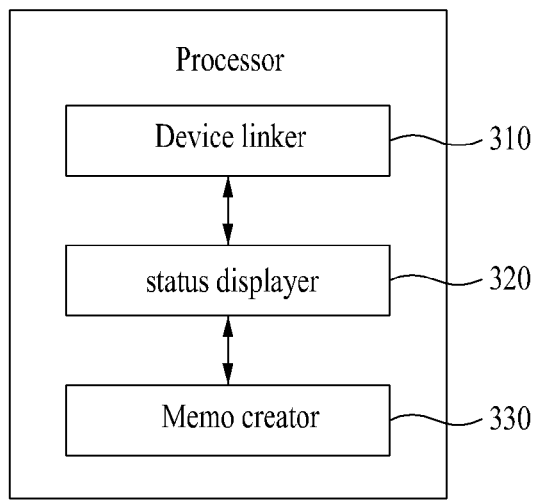
FIG. 3 is a block diagram illustrating components includable in a processor of a computer apparatus according to at least one example embodiment.
Figure 4:
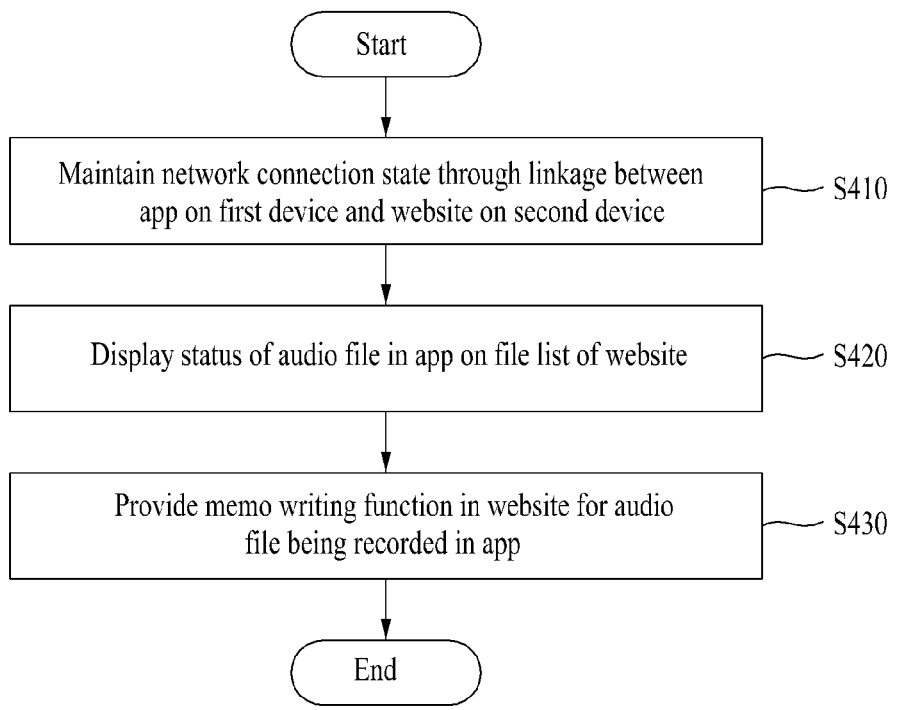
FIG. 4 is a flowchart illustrating a method performed by a computer apparatus according to at least one example embodiment.

FIG. 3 is a diagram illustrating an example of components includable in a processor of a computer apparatus according to at least one example embodiment, and FIG. 4 is a flowchart illustrating an example of a method performed by a computer apparatus according to at least one example embodiment.

The computer apparatus 200 according to the example embodiment may provide a client (i.e., the user side of a client/server configuration) with an audio record management service through a dedicated app installed on the client and a dedicated website related to the computer apparatus 200 accessible on the client. A computer-implemented audio record management system may be configured in the computer apparatus 200.

Referring to FIG. 3, to perform the audio record management method of FIG. 4, the processor 220 of the computer apparatus 200 may include a device linker 310, a status displayer 320, and a memo creator 330. Depending on example embodiments, the components of the processor 220 may be selectively included in or excluded from the processor 220. Also, depending on example embodiments, the components of the processor 220 may be separated or merged for representations of functions of the processor 220.

The processor 220 and the components of the processor 220 may control the computer apparatus 200 to perform operations S410 to S430 included in the audio record management method of FIG. 4. For example, the processor 220 and the components of the processor 220 may be configured to execute an instruction according to a code of at least one program and a code of an OS included in the memory 210.

Here, the components of the processor 220 may be representations of different functions of the processor 220 performed by the processor 220 in response to an instruction provided from the program code stored in the computer apparatus 200. For example, the device linker 310 may be used as a functional representation of the processor 220 that controls the computer apparatus 200 to control a linkage between devices in response to the instruction.

The processor 220 may read a necessary instruction from the memory 210 to which instructions associated with the control of the computer apparatus 200 are loaded. In this case, the read instruction may include an instruction for controlling the processor 220 to perform the following operations S410 to S430.

The following operations S410 to S430 may be performed in an order different from the order of FIG. 4, and a portion of operations S410 to S430 may be omitted or an additional process may be further included.

Referring to FIG. 4, in operation S410, the device linker 310 may maintain a network connection state between a first electronic device and a second electronic device through linkage between an app on the first device and a website on the second device. Here, the app represents an app dedicated for an audio record management service and the website represents a website dedicated for the audio record management service. The first electronic device and the second electronic device refer to different electronic devices 110, 120, 130, and 140 of a user that uses the same account in the app and the website in relation to the audio record management service.

The following description is made with the assumption of a use environment of recording through an app installed in a mobile device (e.g., the electronic device 110) and writing a memo in a website connected through a PC (e.g., the electronic device 140) in relation to an audio being recorded. The use environment is provided as an example only. The device linker 310 may maintain a network connection state for the audio record management service between the mobile device and the PC by linking a mobile app and a PC website that are logged in with the same account by the user.

In response to an execution of an operation related to an audio record, such as an audio recording, an audio playback, upload of an audio file, conversion of an audio file to text, etc., in the mobile app, the device linker 310 may automatically execute the PC website and may start linkage between the mobile app and the PC website.

In operation S420, the status displayer 320 may display status information of an audio file being recorded in the mobile app on a file list of the PC website through linkage between the mobile app and the PC website in the network connection state. When recording is in progress in the mobile app, the status displayer 320 may display the audio file being recorded on the file list provided on the PC website and may display status information indicating that the corresponding audio file is being recorded. The status displayer 320 may jointly display a status (recording) and a recording time in the mobile app on the file list on the PC website in association with the audio file being recorded in the mobile app.

The status displayer 320 may display on the PC website shown on the screen of the PC, all status values in the mobile app in addition to a recording status, such as, for example, a playing back status indicating a state in which the corresponding audio file is being played back, an uploading status indicating a state in which the audio file is being uploaded, a text-conversion status indicating a state in which a text conversion for the audio file is being performed, a standby status indicating a state of waiting for uploading or text conversion, a completion status indicating a state in which the upload or the text conversion of the audio file is completed.

In operation S430, in response to a selection of the audio file being recorded in the mobile app from the file list on the PC website, the memo creator 330 may provide a memo writing function on the PC website for the corresponding audio file. The PC website may include an interface capable of selecting an audio file being recorded in the mobile app and an interface capable of writing a memo for the selected audio file. In the case of writing a memo on the PC website for the audio file being recorded in the mobile app, a timestamp of a time at which the memo is written may be displayed based on a recording time in the mobile app. The memo writing function through the PC website may also be provided for an audio file being played back in the mobile app as well as the audio file being recorded in the mobile app.

The processor 220 may create an audio record by receiving the audio file recorded in the mobile app and by converting the corresponding audio to text. The mobile device may transfer the audio file being recorded through a recording function of the mobile app or may transfer the audio file stored on the mobile device. The processor 220 may create an audio record that is a result of converting audio data corresponding to an utterance section by a speaker to text using known voice recognition technology. Here, the processor 220 may apply speaker segmentation technology for dividing an utterance section for each speaker in a process of creating the audio record. In the case of an audio file being recorded in a situation in which a plurality of speakers utters out of predetermined order such as in a meeting, an interview, a transaction, a trial, and the like, the processor 220 may segment and automatically record the contents of utterance for each speaker.

For an audio file being recorded in the mobile app, the memo creator 330 may configure a memo written through the PC website in a separate file format and may provide the memo for the corresponding audio file in a form linkable in both the mobile app and the PC website.

The memo creator 330 may manage a memo written by the user in the PC website for an audio file being recorded or played back in the mobile app by matching the memo to an audio record created from the corresponding audio file. The memo creator 330 may match the audio record and the memo written during recording based on the time at which recording is in progress in the mobile app. The audio record may include a timestamp that represents a starting point of an utterance section of a speaker and the memo creator 330 may also manage a memo written in a corresponding section based on the timestamp of the audio record. Likewise, for an audio file of which an audio record is present, the memo creator 330 may match and record the audio record and a memo written while audio playback, based on the time at which the audio file is being played back in the mobile app. That is, the memo creator 330 may match and manage the memo written in an utterance section of a specific point in time with an audio record of the corresponding specific point in time.

In response to receiving an instruction to select a specific audio file through the mobile app or the PC website, the processor 220 may link and provide an audio record and a memo of the selected specific audio file. The processor 220 may display an audio record and a memo written during recording or playback of audio in a dual view scheme such that the memo may be easily and conveniently verified with the audio record. The dual view scheme refers to a scheme of displaying the audio record and the memo in parallel in two columns and provides an interface capable of easily searching for a chat record by displaying an audio record in which audio is converted to text and a memo written during recording or playback of the corresponding audio in parallel. In addition to a scheme of displaying the audio record and the memo in a dual view manner, the processor 220 may be implemented to display one of the audio record and the memo alone depending on a user selection.

FIGS. 5 to 12 illustrate examples of a user interface screen for managing an audio record according to at least one example embodiment.

Figure 5:
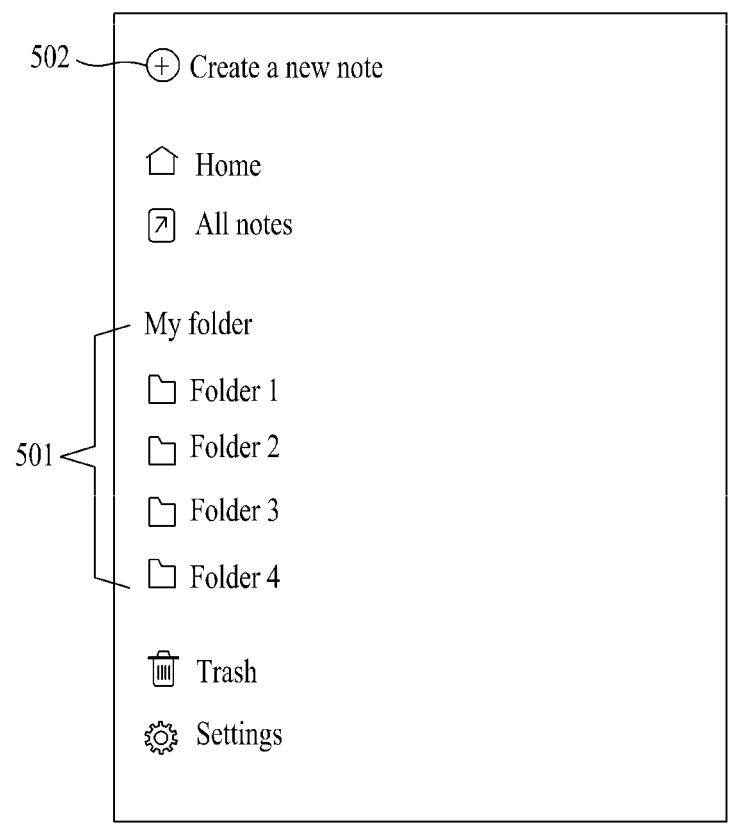
FIGS. 5 to 12 illustrate examples of a user interface screen for managing an audio record according to at least one example embodiment.
Figure 6:
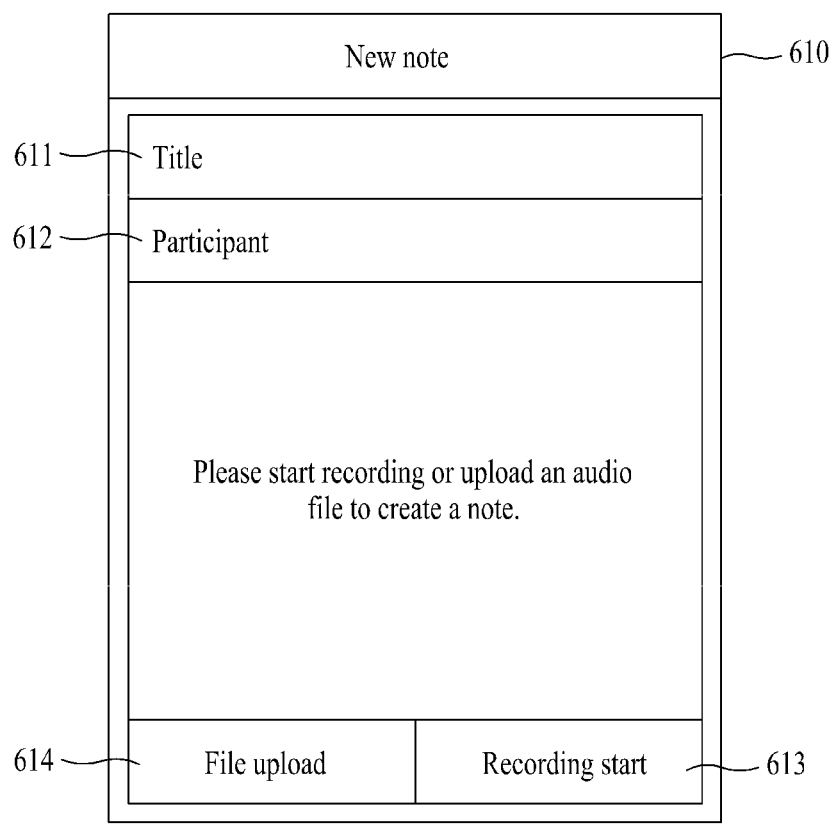
Figure 7:
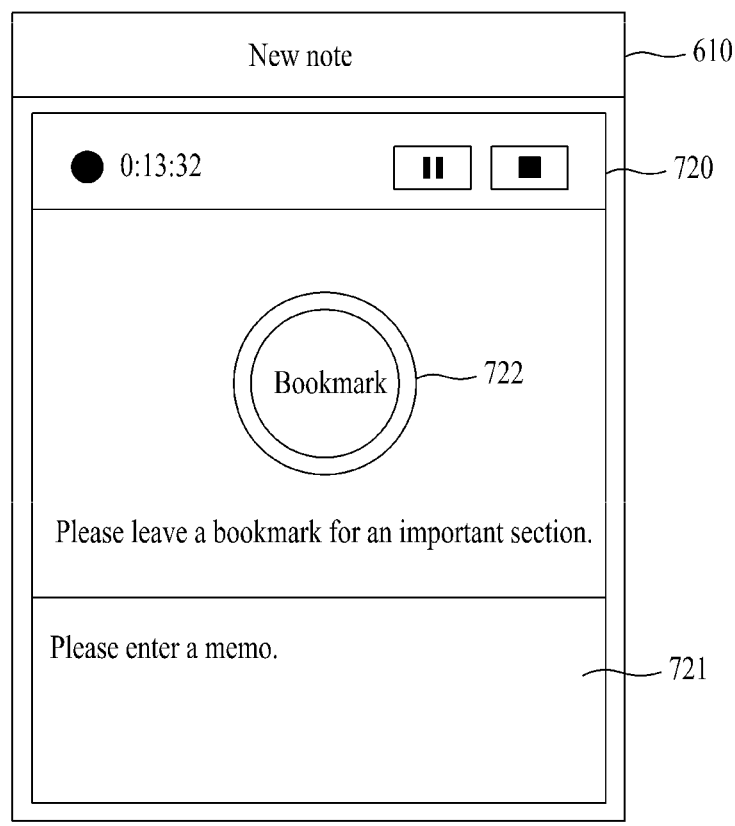

FIGS. 5 to 7 illustrate examples of a mobile app interface screen 500 on a mobile device (e.g., the electronic device 110) to describe a process of performing an audio recording according to at least one example embodiment.

Referring to FIG. 5, the mobile app interface screen 500 may include a main menu list for providing a service as a home screen configuration of an audio record management service and, for example, may include a folder list 501 for managing an audio record by folders. The mobile app interface screen 500 may include a "Create a new note" menu 502 for creating a new audio record.

Referring to FIG. 6, in response to a selection of the "Create a new note" menu 502 on the mobile app interface screen 500, the processor 220 provides an audio record creation screen 610. The audio record creation screen 610 may include a "Title" input field 611 for inputting the title of an audio record, a "Participant" input field 612 for inputting participant information, a "Recording start" menu 613 for audio recording, and a "File upload" menu 614 for uploading an audio file. That is, the processor 220 may provide a recording function for creating an audio record and a file upload function.

Referring to FIG. 7, in response to a selection of the "Recording start" menu 613 on the audio record creation screen 610, the processor 220 provides an audio recording screen 720. The audio recording screen 720 may include a basic recording interface and may also include, for example, recording time information, a pause button for pausing the recording, and an end button for terminating the recording.

In particular, the audio recording screen 720 may include a memo interface 721 capable of writing a memo during recording and a bookmark interface 722 capable of recording a bookmark during recording. Here, the memo interface 721 may include, for example, a text-based input, a photo or video capturing function, and a file attachment function. The user may write important contents or attach contents related to a corresponding audio during recording as a memo through the memo interface and may also leave a bookmark at a recording time of an important section through the bookmark interface 722 in addition to a memo. The memo or the bookmark input during recording may be recorded based on a recording progress time. For example, a recording progress time at a time at which a memo starts to be written may be recorded as a memo creation time and a recording progress time at a time at which a bookmark is input may be recorded as a bookmark designation time.

Although a bookmark for an audio record is described as a passive setting using the bookmark interface 722, it is provided as an example only and the bookmark may also be implemented through an automatic setting function. For example, a bookmark may be automatically recorded in a section in which a preset main keyword (e.g., a title or a tag of an audio record) is uttered.

In response to a selection of the "File upload" menu 614 on the audio record creation screen 610, the processor 220 may provide a file search screen for searching for an audio file in a client. In response to a selection of a specific file on the file search screen, the processor 220 provides a file upload screen for executing uploading of the selected specific file. The file upload screen may include information (e.g., a file name, a file length, etc.) about the selected specific file and a progress bar indicating a progress status of file upload.

When audio recording is completed through the audio recording screen 720 or when file uploading is completed through the file upload screen, the processor 220 may display a progress status of an audio record creation process of converting audio to text on the audio record creation screen 610. In the case of recording, the audio file may be uploaded in real time while recording. Alternatively, when the recording is completed, the recorded audio file may be uploaded in bulk.

For an audio file of which an audio record creation process is completed, the processor 220 may temporally match and jointly provide an audio record and a memo (and a bookmark) of the corresponding audio file through the mobile app interface screen 500.

FIGS. 8 to 12 illustrate examples of a PC website interface screen 800 on a PC (e.g., the electronic device 140) to describe a process of writing a memo during recording through linkage with a mobile app according to at least one example embodiment.

Similar to the mobile app interface screen 500, the PC website interface screen 800 may include a main menu list for providing a service as a home screen configuration of an audio record management service.

Figure 8:
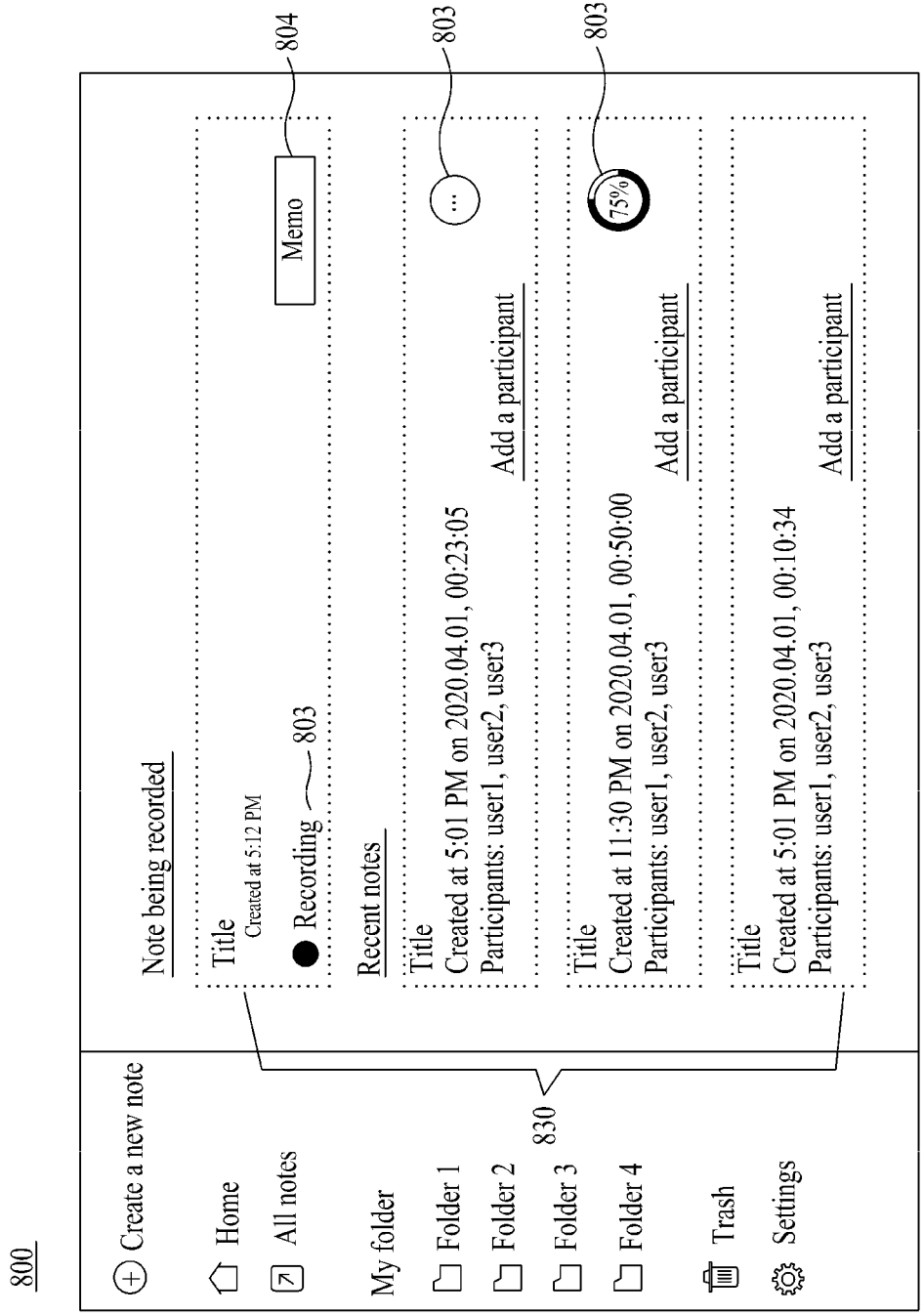

The processor 220 may display status information related to an audio record in the mobile app on a PC website through linkage between the mobile app and the PC website. Referring to FIG. 8, the processor 220 may display, on the PC website interface screen 800, a file list 830 including an audio file, linked with the mobile app. The file list 830 may include an audio file accessible through linkage with the mobile app, such as, for example, an audio file that is being recorded or played back in the mobile app, an audio file that is waiting for upload or text conversion, and an audio file of which upload or text conversion is completed. The processor 220 may display status information 803 about each audio file, that is, a status value in the mobile app through the file list 830 on the PC website interface screen 800.

The processor 220 may classify and display audio files included in the file list 830 by the status information 803. For example, the processor 220 may classify the audio files into a group in a state in which a memo writing is possible and other audio files. An audio file in a state in which a memo writing is possible may include an audio file being recorded or an audio file being played back in the mobile file. Referring to FIG. 8, the processor 220 may provide a "Memo" list 804 for writing a memo for an audio file being recorded in the mobile app among audio files included in the file list 830 on the PC website interface screen 800.

Figure 9:
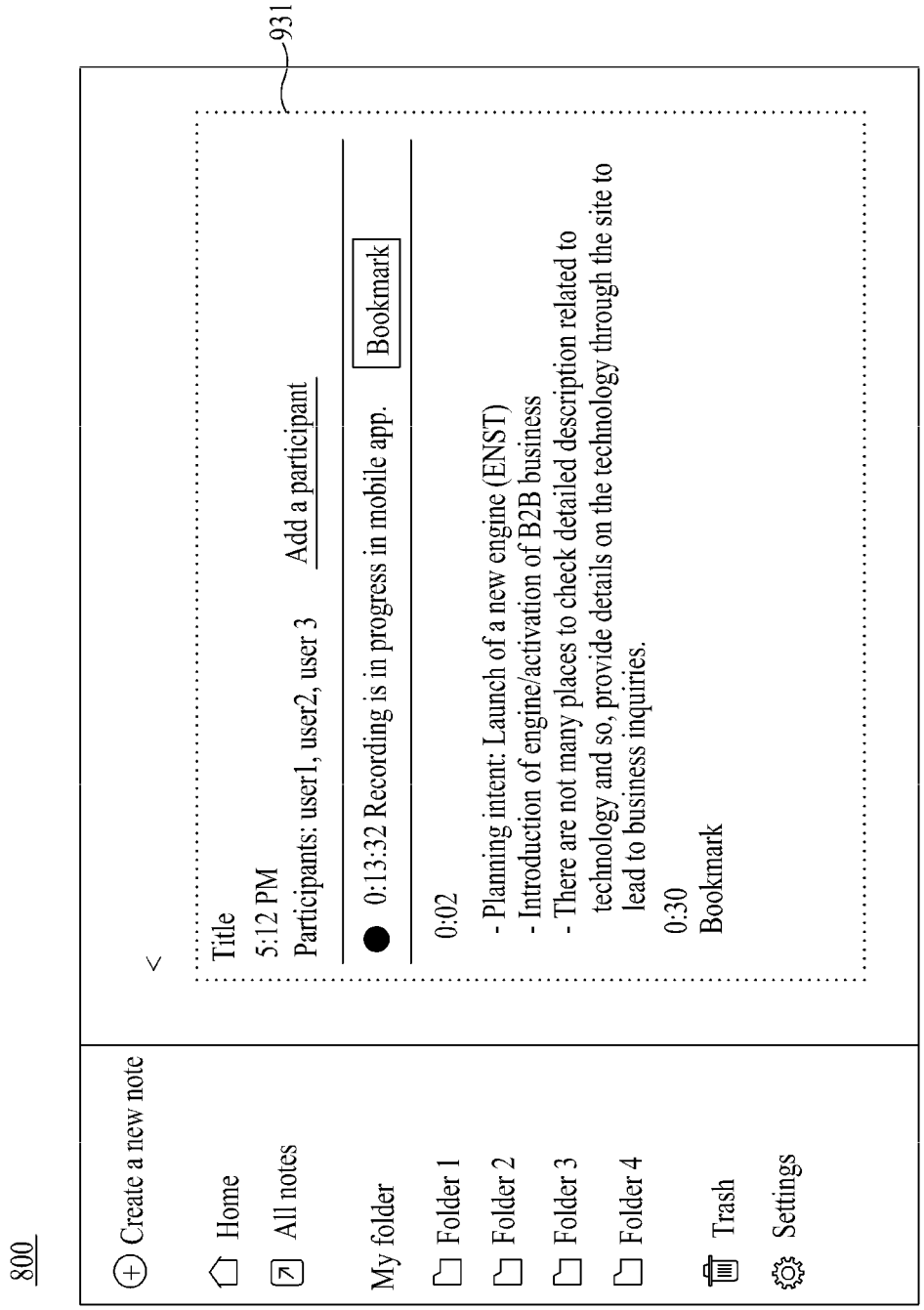

Referring to FIG. 9, in response to a selection of the "Memo" icon 804 for a specific audio file from the file list 830 on the PC website interface screen 800, the processor 220 provides a memo creation screen 931. File information including the title and the participants of an audio file being recorded in the mobile app and the status (recording) and the recording time in the mobile app may be displayed on the memo creation screen 931. The memo creation screen 931 may include a text-based input, a photo or video capturing function, and a file attachment function as an interface for writing a memo. Also, the memo creation screen 931 may further include a bookmark interface capable of recording a bookmark in an audio file being recorded in the mobile app. When a memo is written on the memo creation screen 931, a timestamp may be displayed based on the recording time of the corresponding audio file being recorded in the mobile app for each memo.

Although it is described that the "Memo" icon 804 for entering the memo creation screen 931 is provided, it is provided as an example only. Depending on example embodiments, instead of providing the "Memo" icon 804 as a separate icon, the memo creation screen 931 may be included in a screen that is entered by selecting a specific audio file, for example, an audio file that is being recorded in the mobile file, from the file list 830.

A memo that is written through the memo creation screen 931 of the PC website for an audio file being recorded in the mobile app may also be verified in the mobile app as well as in the PC website in association with the corresponding audio file.

In response to receiving an instruction to select a specific audio file through the mobile app or the PC website, the processor 220 may provide an audio record and a memo of the selected specific audio file through linkage therebetween.

Figure 10:
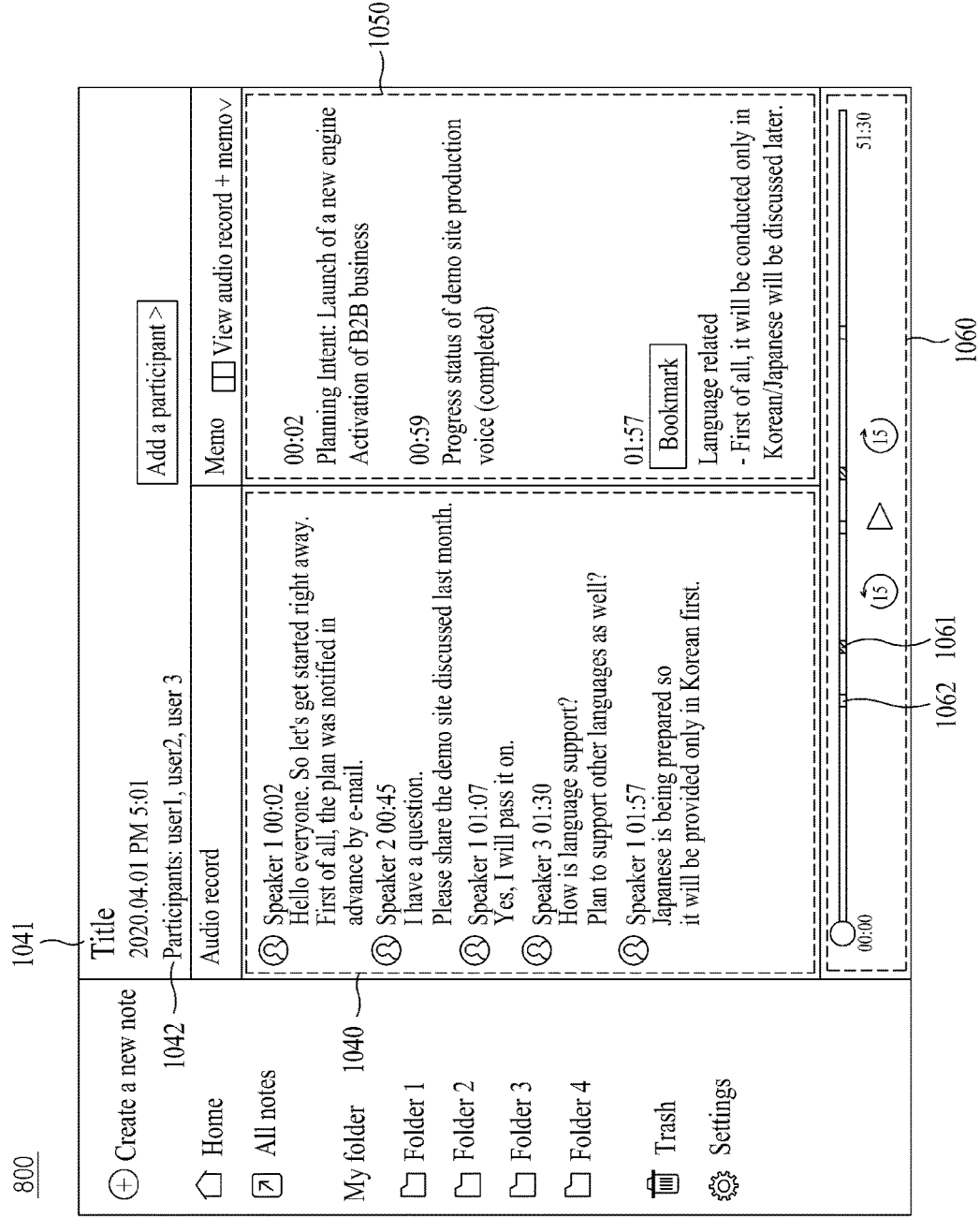

Referring to FIG. 10, for example, in response to a selection of a specific audio file from a file list provided from the PC website interface screen 800, the processor 220 may jointly display an audio record area 1040 and a memo area 1050 in a dual view scheme for the selected specific audio file. A title 1041 and participant information 1042 input in the audio record creation process may be displayed on the PC website interface screen 800. Also, a controller area 1060 for controlling playback of an audio file may be included.

Text converted from the audio of a corresponding section may be displayed on the audio record area 1040 for each section. Here, a timestamp may be displayed based on a point in time at which a vocal sound is uttered in a corresponding audio file. A memo that is written during the recording of the audio file may be displayed on the memo area 1050. Here, for each memo, a recording progress time at the time at which a corresponding memo starts to be written may be displayed as a timestamp of the corresponding memo.

The processor 220 may display in parallel the audio record area 1040 and the memo area 1050 in two columns. Here, the processor 220 may match and display the audio record area 1040 and the memo area 1050 based on the timestamp. For example, the processor 220 may display a memo written at 00:02 at which Speaker 1 made an utterance in line with the text of a corresponding utterance section.

The processor 220 may simply arrange the audio record area 1040 and the memo area 1050 in temporal order without aligning the audio record area 1040 and the memo area 1050 on the same line based on a timestamp. In addition, a scheme of arranging the audio record area 1040 and the memo area 1050 may be readily changed within the dual view scheme.

The controller area 1060 may include a progress bar, a play/pause button, a skip backward button, a skip forward button, a volume control button, and the like. Also, a memo indicator 1061 indicating a section in which a memo is written and a bookmark indicator 1062 indicating a section in which a bookmark is recorded may be displayed on the progress bar.

Indicator display elements (e.g., color, shape, etc.) may be differently applied to easily distinguish between the memo indicator 1061 and the bookmark indicator 1062.

In response to a selection from the user of the text of a specific utterance section on the audio record area 1040, the processor 220 may play back an audio of a corresponding section. In response to a selection from the user of a specific memo on the memo area 1050, the processor 220 may play back an audio of the section in which the corresponding memo is written.

The processor 220 may synchronize selection areas between the audio record area 1040 and the memo area 1050. For example, in response to a selection from the user of a text in a specific utterance section on the audio record area 1040, the processor 220 may highlight and display a memo written in the corresponding section within the memo area 1050.

The user may view the audio record area 1040 and the memo area 1050 together, and may grasp the contents of a conversation at a glance since it is possible to easily and conveniently conduct a search through the memo indicator 1061 and the bookmark indicator 1062 on the progress bar within the controller area 1060.

The processor 220 may provide a view mode for selectively displaying only one of the audio record area 1040 and the memo area 1050 according to a selection of the user in addition to the dual view scheme of jointly displaying the audio record area 1040 and the memo area 1050.

Figure 11:
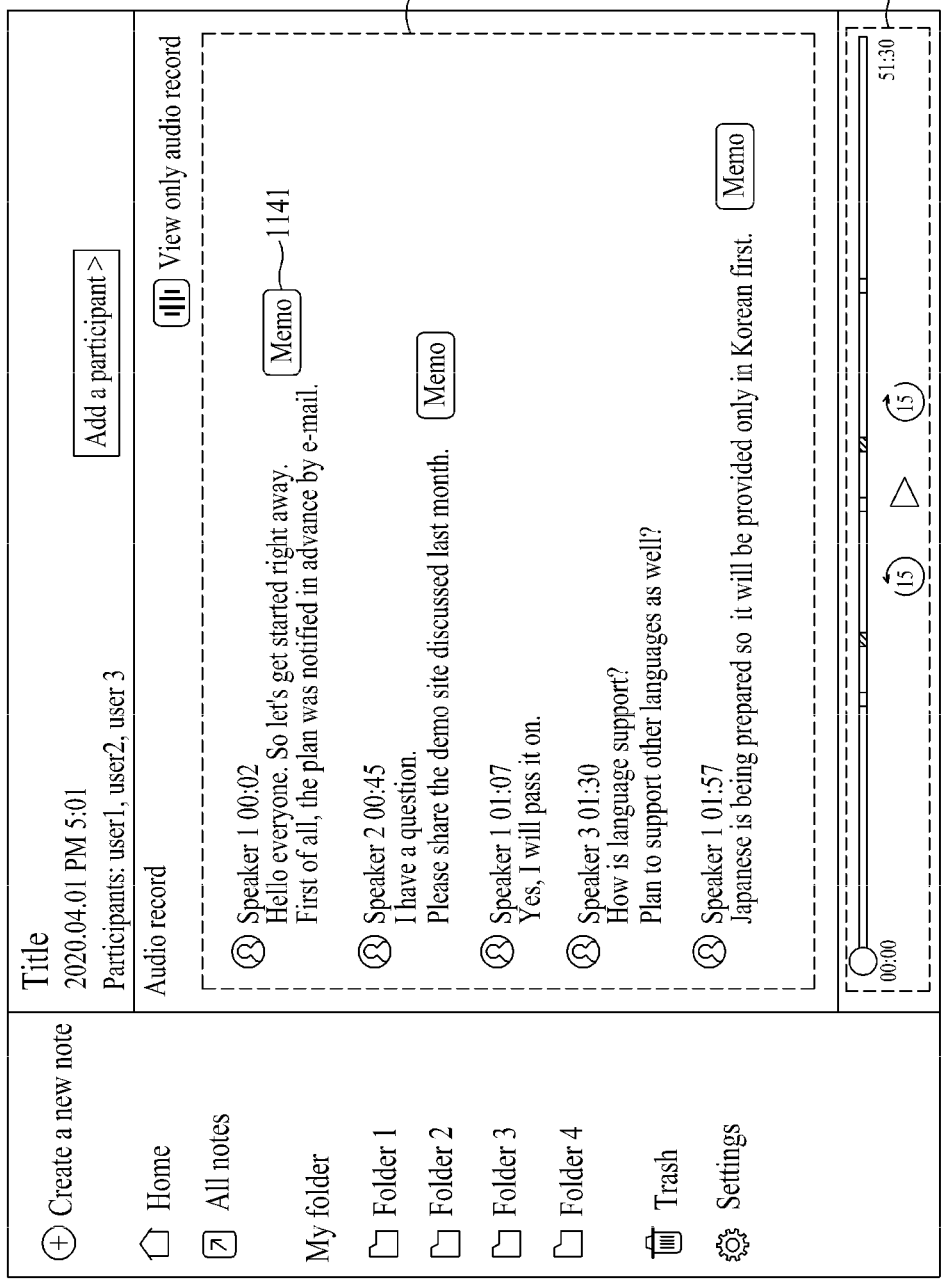

Referring to FIG. 11, the processor 220 may display the audio record area 1040 without displaying the memo area 1050. Here, the processor 220 may provide the controller area 1060 for controlling playback of an audio file.

In a view mode of displaying only the audio record area 1040, the processor 220 may display the text of an utterance section in which a memo is written to be distinguished from the text of another section in the audio record area 1040. For example, a memo icon 1141 may be displayed as a tag indicating that a memo is present in an utterance section of a corresponding audio record.

Figure 12:
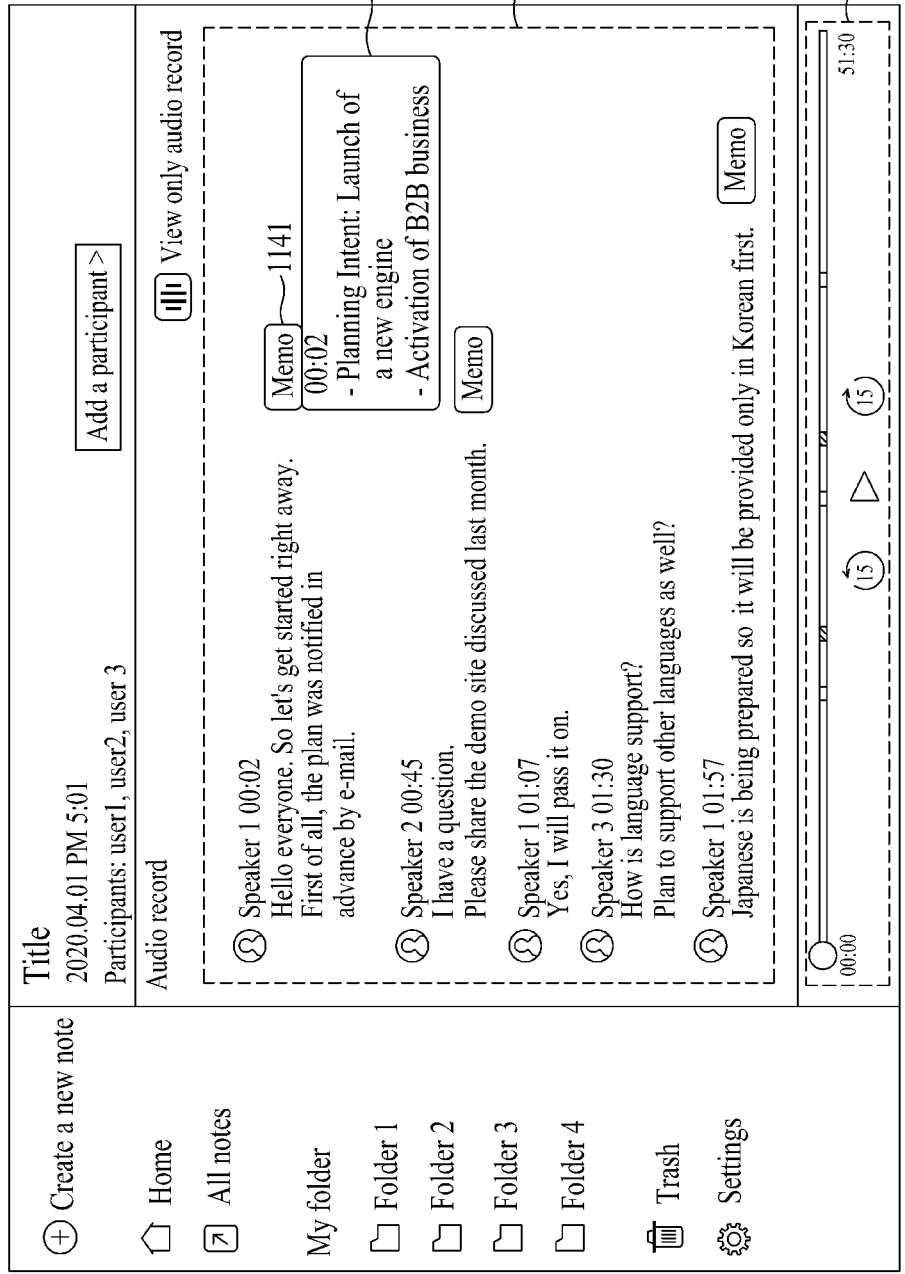

Referring to FIG. 12, in response to a selection of the memo icon 1141 of a specific text on the audio record area 1040, the processor 220 may display a full text 1270 of a memo written in an utterance section of a corresponding audio record.

The processor 220 may provide an interface that enables mutual search and verification in a dual view mode for displaying both the audio record area 1040 and the memo area 1050 and in a view mode for displaying only one of the audio record area 1040 and the memo area 1050.

According to some example embodiments, it is possible to display an audio file being recorded in a mobile app on a PC website through linkage between the mobile app and the PC website and, in response to a selection of the audio file being recorded in the mobile app from the PC website, to provide a memo creation function for the corresponding audio file.

According to some example embodiments, it is possible to conveniently search for an audio record and a memo by matching a record in which a recorded audio is converted to text and a memo written in association with the recorded audio and by displaying the record and the memo in a dual view.

The apparatuses described herein may be implemented using hardware components, software components, and/or a combination thereof. For example, as a hardware component, a processing device may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and/or multiple types of processing elements. For example, a processing device may include multiple processors or a processor and a controller. In addition, different processing configurations are possible, such as parallel processors.

Software may include a computer program, a piece of code, an instruction, or some combination thereof, for independently or collectively instructing or configuring the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. Software also may be distributed over network coupled computer systems so that the software is stored and executed in a distributed fashion. In particular, software and data may be stored by one or more computer readable storage mediums.

The methods according to the example embodiments may be recorded in non-transitory computer-readable recording media as program instructions to implement various operations embodied by a computer. The media may also include, alone or in combination with the program instructions, data files, data structures, and the like. Examples of non-transitory computer-readable recording media include magnetic media such as hard disks, floppy disks, and magnetic tape; optical media such as CD ROM disks and DVD; magneto-optical media such as floptical disks; and hardware devices that are specially designed to store and perform program instructions, such as read-only memory (ROM), random access memory (RAM), flash memory, and the like. Examples of other media may include recording media and storage media managed by an app store that distributes applications or a site, a server, and the like that supplies and distributes other various types of software. Examples of program instructions include both machine code, such as produced by a compiler, and files containing higher level code that may be executed by the computer using an interpreter.

The foregoing description has been provided for purposes of illustration and description. It is not intended to be exhaustive or to limit the disclosure. Individual elements or features of a particular example embodiment are generally not limited to that particular embodiment but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An audio record management method performed by a computer apparatus having at least one processor configured to execute computer-readable instructions included in a memory, the audio record management method comprising:
linking an app dedicated for audio record management installed in a first device and a website dedicated for audio record management connected to a second device, the first device and the second device being located separately from each other and being accessible to the user using a same user account of the user;
displaying an audio file being recorded at the first device or being played back in the app together with status information related to the audio file on a file list on the website accessible with the user account of the user through a linkage between the app and the website, the status information visually indicating that the audio file is being recorded at the first device; and displaying, on the website, a memo creation interface corresponding to the audio file being recorded at the first device to enable a memo to be created by the user at the second device while the audio file is being recorded at the first device.

2. The audio record management method of claim 1, wherein the displaying of the audio file comprises displaying a recording time or a playback time related to the audio file on the file list on the website.

3. The audio record management method of claim 1, wherein the memo creation interface is an icon displayed on the website, adjacent to the audio file being recorded.

4. The audio record management method of claim 1, further comprising:

providing a memo creation screen for the audio file on the website in response to a selection of the audio file from the file list.

5. The audio record management method of claim 4, wherein the providing of the memo creation screen comprises displaying a timestamp based on a recording time or a playback time in the app for each memo written through the memo creation screen on the website.

6. The audio record management method of claim 4, further comprising:

providing a memo written for the audio file in a form linking the app and the website in association with the audio file.

7. The audio record management method of claim 4, further comprising:

managing a memo written for the audio file by matching the memo to an audio record in which the audio file is converted to text.

8. The audio record management method of claim 7, further comprising:

jointly displaying the audio record and the memo through a dual view scheme in response to a selection of the audio file in the app or the website.

9. A non-transitory computer-readable recording medium storing instructions that, when executed by a processor, cause a processor in a computer to implement the audio record management method of claim 1.

10. A computer apparatus comprising:

at least one processor configured to execute computer-readable instructions included in a memory, wherein the at least one processor comprises:

a device linker configured to link an app dedicated for audio record management installed in a first device and a website dedicated for audio record management connected to a second device, the first device and the second device being located separately from each other and being accessible to teh user using a same user account of the user;

a status displayer configured to display an audio file being recorded at the first device or being played back in the app together with status information related to the audio file on a file list on the website accessible with the user account of the user through a linkage between the app and the website, the status information visually indicating that the audio file is being recorded at the first device and display, on the website, a memo creation interface corresponding to the audio file being recorded at the first device to enable a memo to be created by the user at the second device while the audio file is being recorded at the first device.

11. The computer apparatus of claim 10, wherein the memo creation interface is an icon displayed on the website, adjacent to the audio file being recorded.

12. The computer apparatus of claim 10, wherein the at least one processor further comprises a memo creator configured to provide a memo creation screen for the audio file on the website in response to a selection of the audio file from the file list.

13. The computer apparatus of claim 12, wherein the memo creator is configured to display a timestamp based on a recording time or a playback time for each memo written through the memo creation screen on the website.

14. The computer apparatus of claim 12, wherein the at least one processor is configured to provide a memo written for the audio file in a form linking the app and the website in association with the audio file.

15. The computer apparatus of claim 12, wherein the at least one processor is configured to manage a memo written for the audio file by matching the memo to an audio record in which the audio file is converted to text.

16. The computer apparatus of claim 15, wherein the at least one processor is configured to jointly display the audio record and the memo through a dual view scheme in response to a selection of the audio file in the app or the website.

* * * * *